United States Patent Office 3,125,610
Patented Mar. 17, 1964

3,125,610
PROCESS FOR THE PREPARATION OF AROMATIC COMPOUNDS FROM ACETYLENICALLY UN-SATURATED HYDROCARBONS
Gustav Daendliker, Birsfelden, and Walter Scheller, Munchenstein, Switzerland, assignors to Ciba Limited, Basel, Switzerland, a Swiss company
No Drawing. Filed Oct. 24, 1961, Ser. No. 147,155
Claims priority, application Switzerland Oct. 28, 1960
5 Claims. (Cl. 260—673)

The present invention provides a process for the manufacture of aromatic compounds from acetylenically unsaturated compounds, such as acetylene or acetylene derivatives, or from mixtures of acetylene and acetylene derivatives.

Numerous processes are known for the formation or manufacture respectively of cyclic compounds from acetylene or acetylene derivatives. More especially, the preparation of aromatic compounds from acetylene is becoming increasingly important because of the growing demand by industry.

In the known Berthelot process acetylene is conducted through glowing glass tubes, whereby a minor amount of benzene and other aromatic compounds is formed in admixture with substantial proportions of undesirable byproducts, such as carbon and tar.

Recent research work has therefore been directed towards enabling acetylene to be cyclized at lower temperatures, more especially by adding suitable catalysts. Thus, for example, as proposed by Reppe, complex nickel compounds obtained by reacting nickel carbonyl with triphenyl phosphine have been used. However, this cyclization method requires an overpressure of 15 atmospheres (gauge) which in turn involves the need for special technical measures and safety precautions to prevent the risk of explosions. There are also known cyclization reactions of acetylene or acetylene derivatives conducted under simpler conditions, but these methods require two-component catalysts which must be inactivated on completion of the reaction. As relevant examples there may be mentioned the combination of metal hydrides or metal alkyls with metal halides, for example triisobutyl aluminum/titanium tetrachloride.

Surprisingly, it has now been found that it is possible to manufacture valuable mononuclear aromatic hydrocarbons from acetylene, or from acetylene derivatives containing only a triple bond as polymerizable unsaturated bonds, or from mixtures of acetylene and such acetylene derivatives, as a rule under atmospheric pressure and within a relatively low temperature range, with the use of catalysts consisting substantially of tungsten halides or tungsten oxyhalides or of mixtures thereof. By the present process the disadvantages connected with the aforementioned processes are overcome.

The present invention provides a process for the manufacture of mononuclear aromatic hydrocarbons by cyclizing acetylenically unsaturated hydrocarbons containing only a triple bond as polymerizable unsaturated bonds, or by cyclizing mixtures of such compounds, wherein the acetylenically unsaturated hydrocarbon or a mixture thereof is introduced into an inert solvent containing as cyclization catalyst a unitary compound which is essentially a tungsten halide, a tungsten oxyhalide or a mixture thereof.

As examples of aromatic compounds that can be manufactured by the present process there may be mentioned the compounds of the general formula (1) 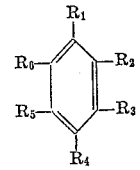

in which $R_1$ to $R_6$ each represents a hydrogen atom or a hydrocarbon radical free from polymerizable unsaturated bonds. As starting material for the compounds of the general Formula 1 there are suitable, for example, compounds of the general formula (2) $R_7$—C≡C—$R_8$ in which $R_7$ and $R_8$ may be identical or different from each other and represent hydrocarbon radicals free from polymerizable unsaturated bonds. Thus, for example, the reaction of dimethylacetylene (2-butyn) yields hexamethylbenzene, while diethylacetylene (3-hexyn) leads to hexaethylbenzene, and 1,2-diphenylacetylene to hexaphenylbenzene.

The present process can be used with special advantage for the manufacture of trisubstituted benzenes that contain as substituents alkyl, aryl or cycloalkyl groups, from acetylene homologues of the general formula (3) $R_9$—C≡C—H in which $R_9$ represents a hydrocarbon radical free from polymerizable unsaturated bonds, for example an alkyl, aryl or cycloalkyl group. Thus, for example, methylacetylene (propyn) yields 1:3:5-methylbenzene (mesitylene) and 1:2:4-trimethylbenzene (pseudocumene), while ethylacetylene (1-butyn) gives rise to triethylbenzene.

Furthermore, the new process is suitable for the manufacture of disubstituted and monosubstituted benzenes by starting, for example, from a mixture of acetylene homologues and acetylene. When the starting gas is, for example, a mixture of acetylene and methylacetylene, a mixture of hydrocarbons can be obtained which contains benzene as well as mono- to trisubstituted benzenes, for example toluene, xylenes, mesitylene and pseudocumene. When a mixture of acetylene and ethylacetylene is used, for example, a mixture of mono-, di- and triethylbenzenes is formed.

The tungsten compounds containing halogen to be used as catalysts according to the invention are halides or oxyhalides of tungsten and may be present in various valency stages. Mixtures of halides of tungsten can likewise be used successfully, as can mixtures of oxyhalides, for example of tungsten oxychlorides with tungsten halides. The cyclization catalysts to be used according to the invention consist advantageously of $WBr_5$, $WBr_6$, $WOBr_4$, $WO_2Br_2$ and more especially of $WCl_6$ and/or $WOCl_4$.

Of special significance is the fact that the catalysts of the invention are unitary compounds, that is to say, they are used without concomitant use of reducing compounds, such as metals or metal hydrides of the first to third group of the periodic system, complex compounds of metal hydrides with boron compounds, or the known aluminum trialkyls. The catalysts of the invention are not sensitive to oxygen, and after completion of the reaction they can be filtered off, dried and regenerated by treatment with halogen. Compared with the hitherto used two-component systems containing metal alkyls, the new one-component tungsten catalysts, which are non-inflammable and lend themselves to regeneration, offer considerable advantages in their application to the cyclization of acetylenically unsaturated compounds.

The use of the halides or oxyhalides, more especially the chlorides or oxychlorides, of tungsten has proved particularly advantageous in the manufacture of benzene or benzene derivatives from acetylene or acetylene derivatives according to the invention. The use of $WCl_6$ or $WOCl_4$ in the manufacture of benzene from acetylene by the present process produces a surprisingly good result.

The present process can be performed in a variety of ways. Thus, for example, the reaction may be carried out in the gas phase, the catalyst being used in its solid, preferably anhydrous form, advantageously in a heatable reactor tube, a constant current of gas containing the starting material being passed over the catalyst. Alternatively, the catalyst may be deposited on a porous support, and it may be of advantage to activate the system catalyst/support before using it for the reaction, for example by heating it to a suitable temperature.

The catalyst as such, or the system catalyst/support, may also contain inert fillers such, for example, as granulated pumice stone or asbestos. Moreover, by shaping in usual manner, for example in an extrusion press, by granulation or tabletting, the catalyst substance can be given that particle size which is the most advantageous for the reaction apparatus to be used in each case. It is of advantage to exclude atmospheric moisture from the reaction apparatus, for example by passing through a dry current of gas or nitrogen before proceeding to the reaction and drying the gases introduced during the reaction in the usual manner.

According to a preferred variant of the present process the catalyst to be used may, if necessary, be suspended with exclusion of moisture in an inert, and advantageously anhydrous, organic solvent and a gas current which contains the acetylenically unsaturated hydrocarbon used as starting material for the reaction is introduced into the suspension. The onset of the reaction is evidenced by the fact that the introduced gas is noticeably absorbed by the suspension. If necessary, the suspension is adjusted to the desired temperature either before or during the introduction of the gas current. As a rule 2 to 40, preferably 10 to 30, grams of tungsten halide or tungsten oxyhalide is used for every liter of solvent.

The temperature within the reactor may be selected from a relatively wide range. Thus, for example, for the manufacture of benzene from acetylene according to the invention a temperature ranging from —10° to 200° C. has proved very suitable, and especially good results are obtained at a temperature ranging from 0° to 150° C. The rate at which the gas current is introduced is selected so that the bulk of the starting material is absorbed by the solution; it is, however, a possible alternative to recycle any portion of the starting material leaving the reactor in the form of unconsumed gas repeatedly into the catalyst suspension. The amount of converted acetylenically unsaturated hydrocarbon referred to the amount of catalyst present depends on the starting material and on the reaction conditions employed. As a rule 0.5 to 50 grams of acetylenically unsaturated hydrocarbon per gram of catalyst undergo conversion.

Solvents suitable for the above variant of the present process are aliphatic, cycloaliphatic or aromatic hydrocarbons, for example meta-xylene, high-boiling mixtures of aliphatic hydrocarbons, cyclohexane or methylcyclohexane. It is of special advantage to select a solvent whose boiling point differs from that of the desired final product sufficiently to enable the solvent to be separated from the final product by distillation. Thus, for example, in the case of the manufacture of benzene according to the invention it is possible, by selecting a suitable solvent having a sufficiently higher boiling point than benzene and working at a temperature within the suspension between the boiling point of benzene and the higher boiling point of the solvent, to distil the benzene formed continuously out of the reaction mixture and to isolate it by condensation or absorption. A further advantage when using an aliphatic or cycloaliphatic hydrocarbon is achieved by adding a minor amount of an aromatic hydrocarbon to it.

The present process is advantageously performed under atmospheric pressure, that is to say under a pressure of about 700 to 800 mm. Hg. Alternatively, the process may be carried out under reduced or superatmospheric pressure, e.g. under a pressure of 100 to 2000 mm. Hg.

The acetylenically unsaturated compound subjected to cyclization may be used in the gaseous or liquid form. In the latter case it is dropped portionwise or continuously into the inert solvent containing the catalyst.

The following examples illustrate the invention.

*Example 1*

(A) 400 cc. of anhydrous meta-xylene, contained in a 4-necked flask of 1 liter capacity connected with a receiver, are mixed under nitrogen with 8 grams of $WCl_6$ which is dispersed in the solvent by means of a vibro-mixer. After having been heated to about 80° C. the solution first turns blue and then gradually green. Through a tube dipping into the suspension heated at 80° C. acetylene is introduced, whereupon a brown precipitate forms. The amount of acetylene absorbed is measured by a flowmeter each at the inlet and outlet ends of the reaction apparatus.

Acetylene was introduced into the solution at an absorption rate of about 80 cc. per minute for 90 minutes, during which time the suspension absorbed 7.2 liters of acetylene.

At the temperature prevailing in the reaction vessel it is possible to distil off the benzene formed continuously and to collect it in the cooled receiver. On completion of the reaction it is of advantage to remove any benzene left in the reaction vessel by introducing more gas containing acetylene and to collect it likewise in the receiver.

After the benzene condensed in the receiver had been purified, about 3 grams of pure benzene were obtained in the above experiment. This corresponds to a yield of about 37% of the theoretical.

The pure benzene obtained in this manner revealed the following physical data:

Melting point _____ 3–4° C.
Boiling point _____ 78–80° C.
Specific gravity $n_D^{20}$ _____ 1,500 (theoretical: 1,500).

(B) When the reaction described above was performed at temperatures of 50°, 100° and 130° C., respectively, benzene was formed in a similar manner.

(C) Benzene was likewise formed when in the reaction described above meta-xylene was replaced by one of the following solvents: Carbon tetrachloride, methylcyclohexane, a mixture of 100 cc. of xylene and 500 cc. of methylcyclohexane, "Shellsol T" (mixture of aliphatic hydrocarbons, boiling range 180–200° C., marketed under this trademark by the manufacturers Shell Chem. Corp.).

*Example 2*

500 cc. of "Shellsol T" (mixture of aliphatic hydrocarbons, boiling range 180–200° C., marketed under this trademark by the manufacturers Shell Chem. Corp.) contained in the reaction vessel described in Example 1 were mixed with 9.5 grams of $WOCl_4$ which is kept in suspension with the aid of a vibro-mixer. After having been heated to 80° C. the orange-colored solution absorbed acetylene at a noticeable rate. About 60 to 100 cc. of acetylene per minute are introduced and completely taken up by the solution. After 3 hours' reaction the introduction of acetylene is discontinued. After repeated distillation the benzene collected in the receptacle revealed the following physical data:

Boiling point _____ 80° C.
Melting point _____ 2 to 4° C.
Specific gravity $n_D^{20}$ _____ 1,500 (theoretical: 1,500).

When the above reaction is performed at 100° C., the rate at which the solution absorbs acetylene can be temporarily raised to 350 cc. per minute.

*Example 3*

500 cc. of anhydrous methylcyclohexane are mixed under nitrogen with 12.3 grams of $WCl_6$ which is kept in suspension with the aid of a vibro-mixer. At about 75° C. methylacetylene was then introduced which underwent an exothermic reaction. Total of methylacetylene absorbed within 150 minutes: 53 grams.

The greyish brown sludge was filtered, washed and then distilled to yield, apart from the solvent, 10 grams of trimethylbenzene which by gas-chromatographic analysis was found to consist of 66% of mesitylene and 33% of pseudocumene. Mesitylene was separated from pseudocumene by distillation.

What is claimed is:

1. A process for the manufacture of mononuclear aromatic hydrocarbons by cyclizing acetylenically unsaturated hydrocarbons, containing as polymerizable unsaturated bonds only one triple bond and being selected from the group consisting of acetylene, dimethylacetylene, diethylacetylene, diphenylacetylene, methylacetylene, ethylacetylene and mixtures thereof, in which process said acetylenically unsaturated hydrocarbons are introduced, at a temperature ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitary catalyst consisting essentially of a tungsten compound containing halogen and said catalyst being selected from the group consisting of tungsten halides, tungsten oxyhalides and mixtures thereof, the mononuclear aromatic hydrocarbons produced are separated by distilling them out of the reaction mixture after filtering off the cyclization catalyst.

2. A process for the production of benzene by cyclizing acetylene, in which process acetylene is introduced, at a temperature ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitary catalyst consisting essentially of a tungsten compound containing halogen and said catalyst being selected from the group consisting of tungsten halides, tungsten oxyhalides and mixtures thereof, the benzene produced is separated by distilling it out of the reaction mixture after filtering off the cyclization catalyst.

3. A process for the production of mesitylene by cyclizing methylacetylene, in which process methylacetylene is introduced, at a temperature ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitary catalyst consisting essentially of a tungsten compound containing halogen and said catalyst being selected from the group consisting of tungsten halides, tungsten oxyhalides and mixtures thereof, the mesitylene produced is separated by distilling it out of the reaction mixture after filtering off the cyclization catalyst.

4. A process for the manufacture of mononuclear aromatic hydrocarbons by cyclizing acetylenically unsaturated hydrocarbons, containing as polymerizable unsaturated bonds only one triple bond and being selected from the group consisting of acetylene, dimethylacetylene, diethylacetylene, diphenylacetylene, methylacetylene, ethylacetylene and mixtures thereof, in which process said acetylenically unsaturated hydrocarbons are introduced, at a temperature ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitary catalyst consisting essentially of a tungsten compound containing halogen and said catalyst being selected from the group consisting of tungsten chlorides, tungsten bromides, tungsten oxychlorides, tungsten oxybromides and mixtures thereof, the mononuclear aromatic hydrcarbons produced are separated by distilling them out of the reaction mixture after filtering off the cyclization catalyst.

5. A process for the manufacture of mononuclear aromatic hydrocarbons by cyclizing acetylenically unsaturated hydrocarbons, containing as polymerizable unsaturated bonds only one triple bond and being selected from the group consisting of acetylene, dimethylacetylene, diethylacetylene, diphenylacetylene, methylacetylene, ethylacetylene and mixtures thereof, in which process said acetylenically unsaturated hydrocarbons are introduced, at a temperature ranging from −10° to 200° C. and under a pressure ranging from 100 to 2000 mm. Hg, into an anhydrous organic solvent containing in suspension 2 to 40 grams of a cyclization catalyst per liter of solvent, said catalyst being a unitary catalyst consisting essentially of a tungsten compound containing halogen and said catalyst being selected from the group consisting of tungsten chlorides, tungsten oxychlorides and mixtures thereof, the mononuclear aromatic hydrocarbons produced are separated by distilling them out of the reaction mixture after filtering off the cyclization catalyst.

References Cited in the file of this patent

FOREIGN PATENTS 802,510   Great Britain _____ Oct. 8, 1958